United States Patent Office 3,386,689
Patented June 4, 1968

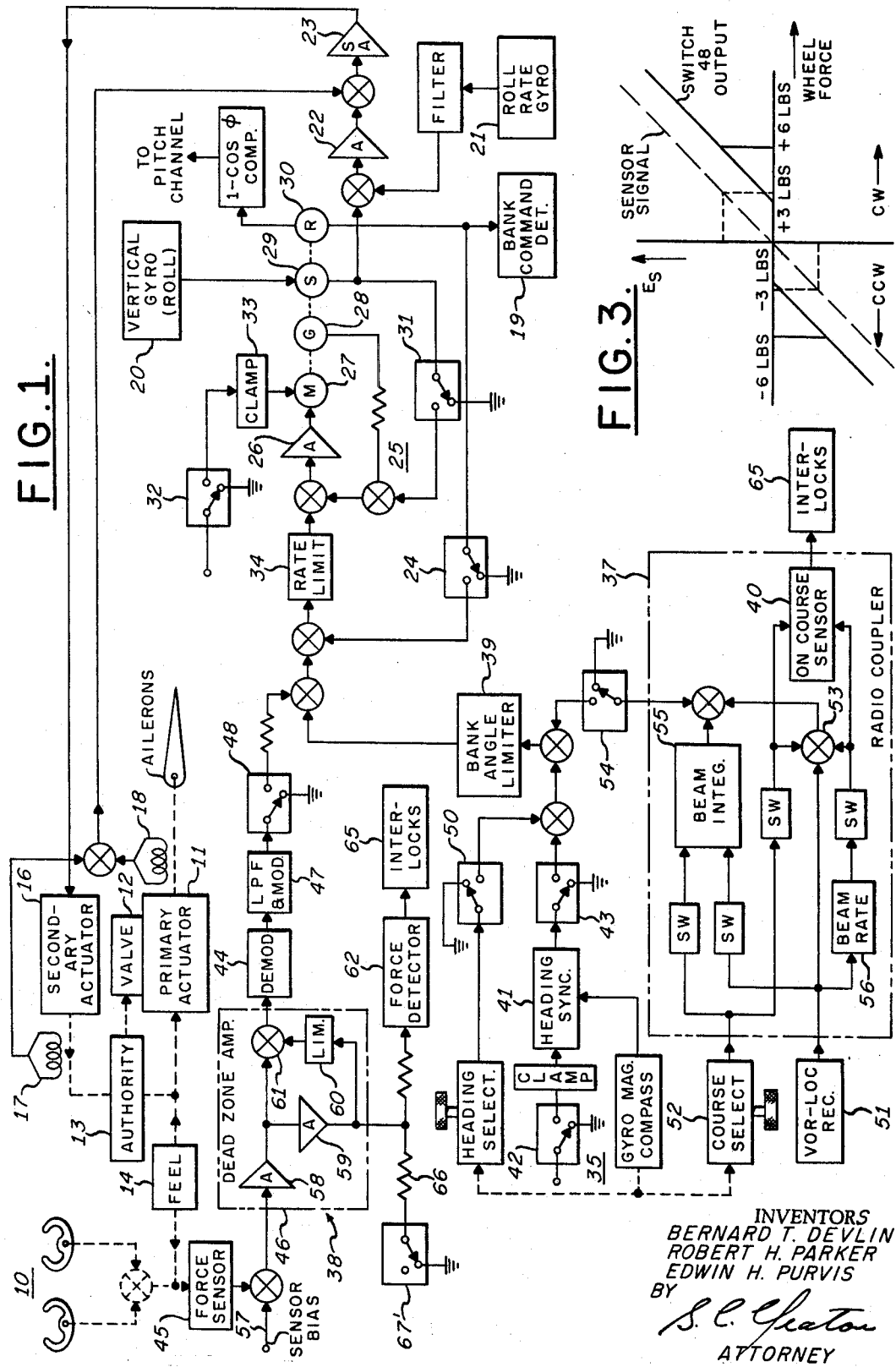

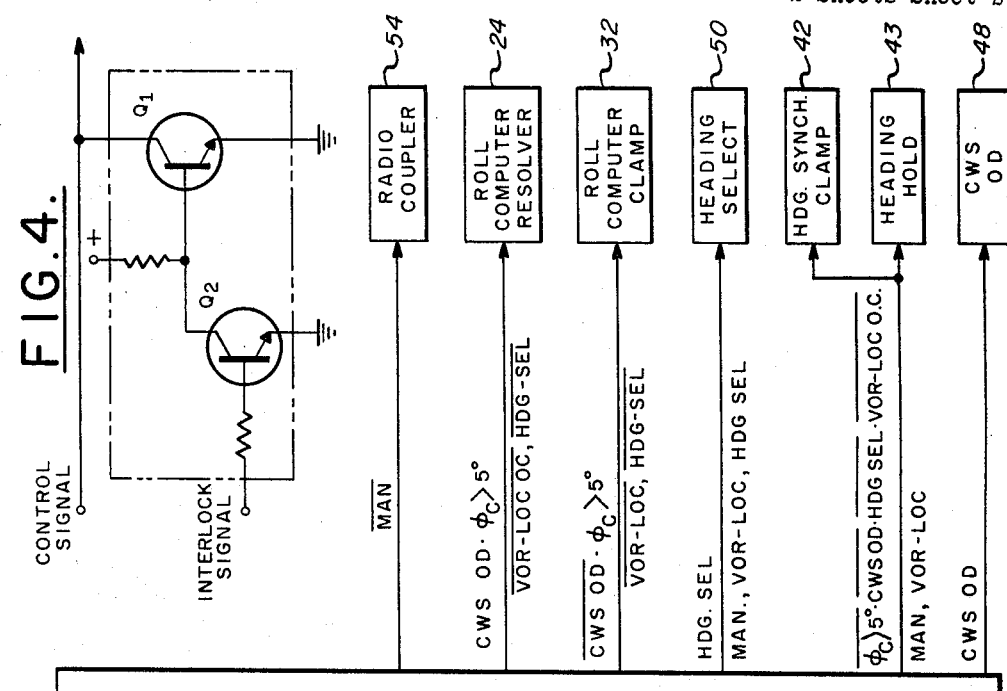
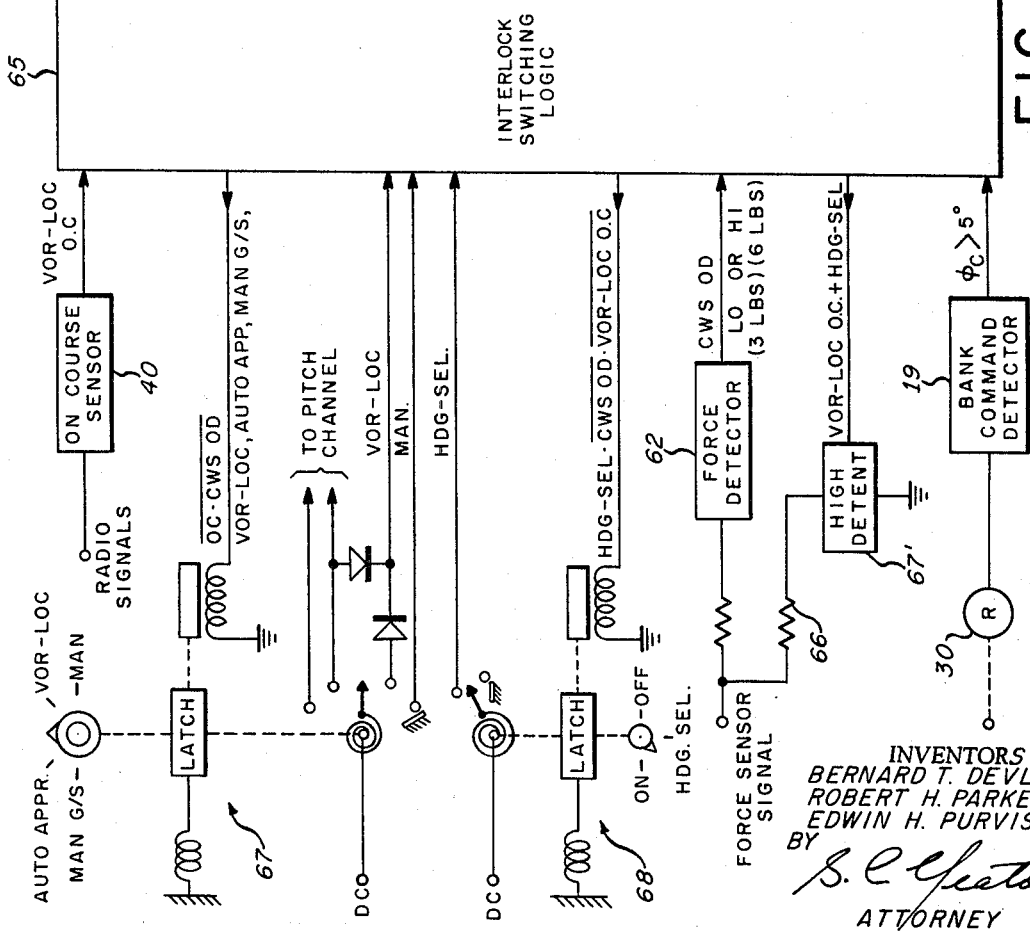

3,386,689
AIRCRAFT AUTOPILOT WITH CONTROL
WHEEL STEERING
Robert H. Parker, Bernard T. Devlin, and Edwin H.
Purvis, Phoenix, Ariz., assignors to Sperry Rand
Corporation, a corporation of Delaware
Filed Feb. 6, 1967, Ser. No. 614,277
8 Claims. (Cl. 244—77)

ABSTRACT OF THE DISCLOSURE

Automatic flight control apparatus operable in a plurality of modes, such as manual maneuvering and various guidance modes in which maneuvering commands by the pilot are generated through force signal generators on the aircraft control wheel. The pilot commands and the various guidance commands are supplied to the control surface actuators through an instrument servo loop. Pilot force signals are detected at different magnitude levels depending upon existing mode of operation, which levels determine the threshold of autopilot control by proportional force command signals through operation of the instrument servo.

A dual level force detector is controlled by interlock circuits whereby under normal manual maneuver modes, a low level force is detected such that unintentional forces applied to control wheel will not generate commands; while under certain external guidance and path modes, a higher level force is detected such as to require a positive and intentional override and termination of such modes and reestablishing normal manual maneuver modes with positive maneuver command. The operation of the instrument servo in response to control wheel force signals is controlled by interlocks such that for commanded attitudes less than a predetermined value the instrument servo operates as a position follow-up servo whereby the commanded attitude is proportional to the magnitude of the force signal; but when the commanded attitude is greater than said value, the instrument servo operates as an integrator whereby the commanded attitude is proportional to the integral of the force signal.

BACKGROUND OF INVENTION

The present invention relates in general to automatic pilot systems for aircraft and more particularly to automatic pilots in which manual maneuver commands to the autopilot are generated by normal movements of the pilot's control column or control wheel rather than by separate knobs on the autopilot control panel or pedestal controller.

Control wheel or control stick steering systems for aircraft autopilots have been proposed in the past, such as for example as shown in the U.S. patents to Hech, No. 3,021,097, and Osder No. 3,094,300. These types of systems are relatively complex and have been designed for helicopter type aircraft and highly maneuverable military aircraft where operating conditions have required this complexity of control. Also, in many so-called control wheel steering systems, the primary control is the direct stick-to-surface control and connections within the autopilot merely provide autopilot synchronization when the control wheel is moved.

SUMMARY OF INVENTION

The present system, however, is designed primarily for relatively large commercial-type transport craft where simplicity of operation is of paramount importance. In this present system, the control wheel signal, which is proportional to the force applied to the control wheel by the pilot, constitutes the autopilot maneuver command thereby eliminating the usual turn and/or pitch knobs on a pedestal controller. Furthermore, the present invention permits the human pilot to maneuver the craft through control wheel steering during automatic path control modes, such as for example, during automatic approaches to VOR or ILS radio beams.

The control wheel steering mode for the autopilot is the normal "manual" mode of operation, that is maneuver commands are produced by control wheel operation. The system includes dual-level threshold or "detent" detection; that is, it provides a dual-level force dead zone. The first or low threshold is provided for preventing command signals from entering the autopilot due to inadvertent small forces on the wheel which might result from the pilot's operation of microphone buttons or unintentional roll forces produced by intentional pitch forces, for example. The second or higher level is provided when the autopilot is operating in one of its path control modes; for example when the craft is being controlled to maintain a VOR or ILS radio course or a preselected magnetic heading. This second and higher threshold requires an intentional override by the pilot of the path control mode whereby the path mode is disconnected and the manual mode is reestablished, the latter being evidenced to the pilot by a positive control signal to the autopilot and a positive response thereto by the aircraft.

The control wheel steering system also provides apparatus by which commanded attitudes below a predetermined value are substantially linearly proportional to the force signal but if the attitude exceeds this value, the attitude rate is proportional to the force signal whereby the resultant attitude is proportional to the time integral of the force signal.

BRIEF DESCRIPTION OF DRAWINGS

FIG. 1 is a schematic block diagram of an aircraft automatic pilot incorporating the teachings of the invention;

FIG. 2 is a schematic diagram of the interlock logic employed for establishing and interrupting the various modes of operation of the autopilot;

FIG. 3 is a graph illustrating the dual force dead zone characteristics; and

FIG. 4 is a schematic illustration of a typical transistor switch employed throughout the autopilot for interlock switching.

DESCRIPTION OF THE PREFERRED EMBODIMENT

Referring now to FIGS. 1 and 2, and for the purposes of illustrating the principles of the present invention, the roll channel only of a flight control system is shown, it being understood of course that these principles may be applied in a similar manner to the pitch control channel. The pilot and copilot control wheels are illustrated schematically at 10 and are shown, also schematically, as being connected to operate a series type hydraulic servo system comprising a primary actuator 11, control valve 12, authority limit device 13, feel device 14, and suitable mechanical cables, linkage, etc. the latter being designated by dotted connections 15. Also connected to operate valve 12 is a secondary actuator 16 which may be a hydraulic actuator positioned by an electrical signal input and may be termed the autopilot servo actuator. Suitable autopilot feedback signal generators 17 and 18 are provided for closing the minor loop autopilot servo system. The actuator system may be of the general type disclosed in detail in U.S. Patent 3,021,097 or 2,936,135 assigned to the same assignee as the present invention.

The overall autopilot roll channel system may be generally conventional and of the character disclosed in assignee's U.S. Patent 3,007,656. As disclosed therein, basic displacement stabilization is provided by a vertical reference device such as vertical gyro 20 while short term or rate stabilization is provided by a rate gyro 21. The signal outputs of these sensors are combined and applied to a preamplifier 22 and servo amplifier 23 the output of which is supplied to the secondary actuator 16 of the surface servosystem, secondary actuator and surface position feedback being provided by sensors 17 and 18 respectively. Thus with the autopilot engaged and no roll commands applied, the aircraft is automatically stabilized in roll.

As disclosed in the above-mentioned Patent 3,007,656, human pilot commands and various automatic guidance commands are supplied to the servo amplifier through an instrument servo loop, generally indicated by reference characters 25 and while this loop is illustrated as being an electromechanical servo loop, it may be all electronic as disclosed in assignee's copending application Ser. No. 598,285, filed Dec. 1, 1966. The electromechanical servo loop 25 comprises an amplifier 26, motor 27, speed generator 28, a synchro control transformer 29 and a synchro resolver 30. Control transformer 29 is connected back-to-back with a synchro transmitter (not shown) positioned in roll by vertical gyro 20 in accordance with the roll attitude of the aircraft, the output of control transformer 29 being supplied as an input to servo amplifier 22. This output is also fed back to the input of amplifier 26 through an engage switch 31 together with the speed signal generated by generator 28 for damping motor operation. With the autopilot engaged, engage switch 31 is open while during disengagement of the autopilot, switch 31 is closed thereby providing synchronization of the roll command computer 25 to the existing roll attitude of the aircraft. For the purpose of the present disclosure, it will be assumed that the autopilot is engaged and the switch 31 open. Means are provided for clamping the roll command computer 25 under certain modes of operation of the system as will be described below. This may be accomplished by closing switch 32 and energizing a motor clamping device 33. Any type of clamping scheme may be employed, for example, the clamp device 33 may merely render the motor 27 unresponsive to any input thereto by grounding the output of amplifier 26.

Depending upon the selected mode of operation, any command input to amplifier 26 results in the operation of motor 27 and a rotation of synchro transformer 29 which in effect changes the reference attitude for the aircraft as defined by the vertical gyro 20. Input commands for the autopilot are introduced to the roll command computer 25 through a suitable rate limiter 34 which, in a conventional manner, limits the maximum roll rate of the aircraft in response to the command signal. The magnitude of the bank angle command is detected by bank command detector 19 which is connected to receive the output of resolver synchro 30 and is employed for controlling interlock switching employed during various modes of operation of the autopilot. Also, the output of resolver synchro 30 may be connected back to the input of the roll command computer by a switch 24 depending upon the mode of operation as will be described below.

For the purpose of illustrating the principles of the present invention, input commands for the autopilot may be supplied from several sources: a gyromagnetic compass system, schematically indicated at 35, a manual heading selector 36, a radio coupler, generally indicated at 37, or from the control wheel steering subsystem 38. Roll commands from the magnetic compass system 35 or the path coupler 37 are supplied to the roll command computer through a bank angle limiter 39 which serves to limit the maximum bank angle that the aircraft may be permitted to assume in response to such commands. The bank angle limits may be varied depending upon the mode of operation as disclosed in the above-mentioned U.S. Patent 3,007,656. Also, the specific structure of the gyromagnetic compass system may be similar to that disclosed in the latter patent and similarly the radio beam coupler 37 may likewise be constructed in accordance with the teachings of this latter patent. The aircraft may be controlled to maintain the heading defined by gyromagnetic compass 35 through a heading synchronizer 41. The heading synchronizer may be an instrument servo similar to the roll command computer 25 in which its control transformer is connected back-to-back with the directional gyro of the gyromagnetic compass system 35. The heading synchronizer 41 may be similarly clamped through operation of switch 42. During commanded turns of the aircraft through control wheel steering subsystem 38, the heading synchronizer is unclamped and placed in a follow-up mode and its output disconnected from the roll angle limiter 39 through switch 43. The operation of the latter will be discussed further below.

In accordance with the teachings of the present invention, roll maneuver commands are supplied to the roll command computer via the control wheel steering subsystem 38. Basically, a signal proportional to control wheel force is generated by a suitable force sensor 45 which may be in any suitable type, for example, such as shown in assignee's U.S. Patent 2,408,770 or 3,114,124, in which an E-type pick off provides an AC signal having an amplitude proportional to the force applied by the pilot to the control wheel and a phase dependent upon the direction of such force. This signal is applied to a dead zone amplifier 46, to be described, suitable signal shaping network 47 and switch 48 to the input of the rate limiter 34 of the roll command computer 25.

In the heading select mode of operation the human pilot may select, by means of a heading selector 36, any desired magnetic heading he wishes to fly. The heading selector may be part of the gyromagnetic compass system 35 and of the type disclosed in the above U.S. Patent 3,007,656. The difference between the existing heading of the aircraft and that selected by the pilot is supplied to the roll angle limiter 39 through a switch 50 as will be described below.

The radio beam coupled 37 may be generally conventional and, as stated, may be of the character set forth in Patent 3,007,656. It receives signals proportional to the lateral displacement of the craft from a selected radio beam from a conventional VOR–LOC receiver 51. If it is desired to initially approach, capture and maintain a VOR beam, a signal proportional to the rate of approach of the craft toward the beam is supplied from a course selector 52 which may be of a type disclosed in assignee's Patents 2,613,352 or 2,999,237 which supplies at its output a signal proportional to the heading of the craft relative to the bearing of the selected radio beam. The displacement and rate of approach terms are combined through a summing network 53, the output of which is supplied to the roll angle limiter 39 through a switch 54. Integral control may be provided in a conventional manner through beam integrator 55. If it is desired to approach, capture and maintain an ILS beam, the rate of approach term during approach may be the course error during approach and after approach may be the derivative of beam displacement or beam rate or combinations thereof. In the latter case, the track damping term is derived through a conventional rate network 56, the beam displacement and beam rate being combined in summing circuit 53, the output of which is similarly applied to the roll angle limiter 39.

Since the present invention is applicable during either a VOR or a LOC beam approach, the VOR and ILS may be used interchangeably and the output of the beam coupler appearing at switch 54 will be a path control or path command signal that is proportional to the displacement plus the rate of approach of a craft toward the beam plus any integral term required for a cross-wind compensation.

For the purposes of the present invention, the automatic control of the aircraft by the radio beam may be divided into two modes: capture and on-course. The armed and captured mode is initiated by pilot selection while the on-course mode is automatically instituted by means of an on-course sensor 40 which detects beam error and beam error rates (on-course error) and supplies an interlock signal when these signals have dropped to a predetermined low value, all as taught generally in Patent 2,998,946.

Thus, the automatic pilot roll channel is capable of operation in a number of modes as follows: roll attitude hold, heading hold, preselected heading, VOR–LOC capture and track and bank angle maneuvering via control wheel steering. The interlock switching required to place the flight control system in these modes are disclosed schematically in FIG. 2 and will be further discussed below.

However, since it is the control wheel steering mode that has prime authority over the other modes of operation, the control wheel subsystem circuits will first be described. An output of the control wheel force sensor 45 is produced whenever the human pilot exerts a force on the control wheel 10 which, as stated, is a phase sensitive AC signal having an amplitude proportional to such force. If necessary, a sensor bias 57 may be provided for adjusting the null of the sensor or adjusting any static force unbalance on the control wheel. The proportional force signal is applied to a dead zone amplifier 46. As illustrated by the dotted line of FIG. 3, the force detector itself does not contain a built in dead zone since it may be desired to vary the dead zone from aircraft to aircraft. In accordance with the backings of the present invention two dead zone widths are provided, one narrow and one wide, and one or the other is effective depending upon the selected mode of operation of the autopilot. These dead zones provide low threshold detent and high threshold detent. When one or the other dead zones is exceeded or becomes effective, the control wheel steering system is said to be out-of-detent (CWS O.D.). The detents are provided as follows. Dead zone amplifier, the purpose of which will be described below, comprises a voltage amplifier 58, detector amplifier 59 and limiter 60. Amplifier 58 amplifies the force sensor signal and its output is supplied along two paths, one to a summing circuit 61 and the other to detector amplifier 59. The output of detector amplifier 59 is applied to a force detector 62 which may comprise a conventional signal magnitude detector circuit designed to supply an output to the interlock system 65 when the output of the force sensor 45 reaches a predetermined value. For example, a suitably biased transistor switch may be employed for this purpose. In the present embodiment, the low threshold value is set to correspond to a force signal equal to slightly less than ±3 pounds of force on the control wheel. This 3 pound force level is provided so that in the normal control wheel steering mode of operation the pilot does not inadvertently command a roll maneuver when he is operating one or more of the electrical switches usually mounted on the control wheel, such as trim switches, microphone switches, etc., or when he is commanding a maneuver about another control axis. For the purposes discussed below, a second threshold level is also provided. This second threshold level is established by the value of resistance 66 connected between the input of detector 62 through interlock switch 67' to ground. By this means, the output of detector amplifier 59 is partially attenuated to thereby effectively require more signal to trigger the force detector 62. In the present embodiment, the second threshold level is selected to be about twice that of the first, i.e., about ±6 pounds. As stated above, whenever the pilot exerts enough force in the control wheel to exceed either the low or high threshold, the control wheel steering system is said to be out-of-detent. Also whenever the force detector supplies an output, either high or low, interlocks 65 operate to close switch 48 to thereby supply the control wheel force signal to the roll command computer 25.

As illustrated in FIG. 3, the dead zone amplifier 46 is provided for the purpose of normally preventing a large switching transient from entering the autopilot. The ±3 pound dead zone is accomplished through limiter 60 and summing circuit 61. The output of amplifier 59 is applied to limiter 60 whose limits are set such that for signals proportional to wheel forces below ±3 pounds, a corresponding proportional signal is provided to summing circuit 61 while for signals proportional to forces greater than ±3 pounds, the output of the limiter will remain constant at the equivalent 3 pound level. The output of limiter 60 is out of phase with the output of amplifier 58 and the output of limiter 60 therefore bucks out force signals corresponding to less than ±3 pounds. Therefore, the output of dead zone amplifier will be a signal proportional only to control wheel forces greater than about ±3 pounds. The detector 62 output may be selected so as to become effective slightly below ±3 pounds so that a small command will be present if desired. The output of dead zone amplifier 46 is applied to demodulator 44 and the resulting D.C. signal applied to a filter circuit and modulator 47 and thence to CWS "detent" switch 48 and roll command computer 25.

It will be noted that the limiting level of limiter 60 is not increased to correspond to the high detent level of about ±6 pounds. As will be described below, the higher detent level is effective only in the path control modes of operation of the autopilot (Heading Select, VOR-ILS, etc.) so that with the high detent the pilot must intentionally and positively override the path mode resulting in its disconnection and establishment of the MAN mode. Since the limiter level is not increased, the dead zone remains at the ±3 pound level so that at the ±6 pound detent level a substantial signal will be inserted into the autopilot resulting in a positive maneuver in response thereto. Note the curves of FIG. 3. This assures the pilot that control wheel steering is effective and that the path mode has been disconnected.

During flight, aircraft vibration or shock or an inadvertent jar of the control wheel by the pilot (greater than the threshold) may cause the overall autopilot and manual pilot flight control system to go into oscillation at its resonant frequency. This may occur because the control wheel sensor signal commands the actuator via the autopilot which in turn moves the control system primary actuator and the control wheel, if the surface servo is of the series type. In order to prevent this oscillation from occurring, filter 47 is provided for attenuating signals at the control system natural frequency.

In FIG. 2 there is illustrated schematically the interlocks switching logic required for controlling the autopilot under the various modes of operation thereof. At the left of the figure, manually operated selector switches are illustrated together with the control wheel sensor 62 and the VOR on-course sensor 40. At the left side of the figure the switches indicated in FIG. 1 are shown while the interlock switching logic is illustrated generally in the center by block 65. It will be understood that the logic circuits of block 65 are conventional and receive initiating signals from the selector switches and sensors and provide signals to the various interlock switches when the conditions illustrated by standard logic nomenclature above each lead exist. The selected mode under which each switch is effective is illustrated by mode designations below these leads. The abbreviations employed are self-evident from the foregoing description and a detailed listing thereof is deemed unnecessary. All of the switches illustrated by the labeled blocks may be of the character shown in FIG. 4. As shown, the collector-emitter circuit of $Q_1$ is connected in shunt to ground with the control signal lead while the base is connected to a source of voltage. The collector-emitter circuit of $Q_2$ is connected from the voltage source to ground and its base energized or not depending upon the existence of an interlock voltage. If no voltage is applied to the base of $Q_2$, $Q_1$ is turned on thereby grounding the control signal, i.e., "opening" the switch. If, however, an interlock signal is applied to the base of $Q_2$, it will cause the voltage at the base of $Q_1$ to decrease thereby turning it off, i.e., closing the switch.

For a clear understanding of the interlock switching required as the autopilot is placed in its various modes of operation each of the modes will be discussed separately. Switch 67 is of the self-latching type, i.e., it will allow latching thereof only under certain conditions. Also, it will automatically revert to the MAN position whenever its solenoid becomes deenergized. A suitable switch is schematically illustrated in the above-mentioned Patent 2,998,946 or in U.S. Patent 2,525,846. Heading select switch 68 may be a similar self-latching type switch.

The roll attitude hold mode is automatically established upon engagement of the system if the bank angle at engagement is greater than 5 degrees. With the system disengaged, switch 31 is closed and the roll command computer 25 is in follow-up on vertical gyro 20. Switch 24 is also closed during disengagement of the pilot. Upon engagement, bank detector 19 senses whether or not the bank angle is greater than or less than 5 degrees. If it is greater than 5 degrees and the control wheel is not out of detent, no interlock signal is supplied to resolver switch 24 thereby maintaining it closed so that resolver 30 continues to supply a position follow-up for the roll command computer 25 (since switch 31 is now open). Simultaneously, and if the control wheel is not out of detent, the roll computer motor 27 will be clamped. Therefore, disturbances after engagement result in an error signal from control transformer 29 which commands aileron deflection through actuator 11 to return the aircraft to whatever bank angle it had upon engagement. If the pilot desires to increase or decrease the bank angle, he operates his control wheel which unclamps motor 27 through switch 32 and opens resolver switch 24 and the bank angle will change until control wheel is again in detent.

If the engaged bank angle is less than 5 degrees and control wheel not out of detent the heading hold mode of operation is automatically established. A time delay may be provided to allow wing leveling to take place without heading over-shoot. Under these conditions, the heading synchronizer 41 is clamped and its output is fed to the roll computer 25. These signal paths are established by supplying an interlock voltage to the heading clamp switch 42 and heading hold switch 43. Subsequent disturbances in heading generate a bank angle command proportional thereto to turn the airplane back to the engage heading.

With the selector switch 67 in the MAN mode, bank angle maneuvering is provided through control wheel steering. The force signal from the control wheel sensor 45 is supplied to the dead zone amplifier 46 and force detector 62 which, if the threshold force is above the normal ±3 pounds, will supply interlock voltage to CWS O.D. switch 48 to thereby close the switch and supply a roll command signal to the roll command computer 25. Simultaneously, the force detector 62 removes interlock voltage from heading hold switch 43 and heading synch clamp switch 42 to remove heading signals from roll command computer 25 and to allow heading synchronization. In accordance with the present invention, if the bank angle commanded by the control wheel signal is less than 5 degrees, bank command detector 19 does not supply an output and roll computer resolver switch 24 remains closed and roll command computer 25 operates as a position follow-up servo on the command signal, i.e., bank angle proportional to a control wheel force. This feature simplifies the pilot's task of holding polarized low bank angle turns otherwise difficult to hold due to the inherent directional stability of a yaw-damped transport type aircraft. If the commanded bank angle exceeds 5 degrees as sensed by the bank command detector 19, roll computer resolver switch 24 is energized (opened) thereby disconnecting roll computer feedback and causing the roll computer 25 to act as an integrator of the command signal. That is, the airplane is commanded to roll at a rate (controlled by rate limiter 34 and generator 28) proportional to control wheel force. When the desired bank angle is obtained, the pilot removes force from the control wheel. The roll command computer 25 is clamped through roll computer clamp switch 32 and the airplane is maintained at the commanded bank angle. Since the bank angle is greater than 5 degrees, heading hold switch 43 and heading synch clamp switch 42 remain energized and the heading synchronizer follows-up on craft heading change. This condition continues until the pilot exerts a subsequent force to increase or to decrease the bank angle. When the bank command goes below 5 degrees and the pilot reduces wheel force below the threshold ±3 pound level, heading hold mode is reestablished.

With the selector switch 67 in the manual mode, the pilot may establish the preselect heading mode (HDG SEL) by engaging heading select switch 68. The interlocks latch the heading select mode switch "on" if the control wheel is not out of detent and automatic VOR-LOC on-course mode has not been established; otherwise, switch 68 will not latch on. A suitable latching type switch is disclosed in the above-mentioned Patent 2,525,846. When the heading hold mode switch is engaged, interlock energization is supplied to the logic 65 which in turn prevents establishing the heading hold mode, i.e., heading hold switch 43 and heading synch clamp switch 42 remain open. Simultaneously, heading select switch 50 is energized (closed) so that the signal from heading preselect synchro 36 is fed to the roll command computer to command a proportional bank angle to turn the airplane to the heading selected. Bank command limiter 39 and rate limiter 34 ensure a smooth maneuver. Roll resolver switch 24 and roll computer clamp switch 32 remain open. Heading select mode may be disengaged by turning heading select switch 68 off or by applying a control wheel force above the threshold value. It will be noted, however, that when the heading select mode is established, high detent switch 67' is energized thereby increasing the control wheel steering force threshold to the higher level. Thus, in accordance with the teaching of the present invention, the pilot must positively and deliberately supply more force than normal to disengage the heading select mode and reestablish the MAN mode. It will also be noted that if the heading select mode was engaged during an automatic approach toward the radio beam, the high detent switch 67' is also actuated to thereby increase the force detector threshold. As soon as the aircraft has captured the radio course and the on-course sensor 40 operates, heading select mode is automatically disengaged.

The VOR-LOC mode is armed by the pilot positioning selector switch 67 to this position. It is assumed that the navigation receiver is tuned to the appropriate frequency and the bearing of the desired course selected. Interlocks are established so that the switch 67 is latched in the VOR-LOC position unless the control wheel is out of detent and VOR-LOC on-course mode has been established. The pilot may also select the automatic approach or manual glide slope position. Since these interlocks involve switching which must be established for pitch channel operation, they need not be discussed herein.

During the armed or initial approach phase of VOR-LOC mode of operation, the pilot may maneuver the aircraft via heading selector 36 or control wheel steering. This is termed supervisory override and provides the pilot with a means for making manual adjustments in craft heading while capturing a beam without having to recycle the mode selector switch 67. When the selector switch 67 is positioned to VOR-LOC, interlock voltage is applied through logic 65 to energize radio coupler switch 54 thereby placing the aircraft under the control of the radio coupler signals. The interlock logic also retains the roll computer clamp switch 32 open. Similarly, heading hold switch 43 and heading synch clamp switch 42 are maintained in an open condition. Now, should the pilot desire to make small corrections in craft heading while under the control of the radio coupler 37, he merely operates his control wheel in the normal manner (low detent) thereby superimposing on the radio commands a roll command to increase or decrease the bank angle through roll command computer 25. By this means, the pilot is able without disengaging his normal radio control to alter his approach to the radio beam. This may be necessary, for one example, in heavy traffic around an airport where the normal approach path may be desired to be extended in order to achieve proper spacing between several approaching aircraft.

Once the aircraft has captured the radio beam, the on-course sensor 40 is actuated and supplies an interlock signal to logic 65 which removes the supervisory override capability. VOR-LOC on-course interlock voltage is applied to high detent switch 67' thereby establishing the higher force level detent. Thus during the on-course mode, if for any reason it is necessary to abort the approach, the pilot must apply considerably more force to the control wheel and in so doing will disengage the radio mode completely and automatically establish the MAN mode of operation. This is accomplished by deenergizing latch relay of mode selector switch 67 as indicated in FIG. 2.

While the invention has been described in its preferred embodiments, it is to be understood that the words which have been used are words of description rather than limitation and that changes within the purview of the appended claims may be made without departing from the true scope and spirit of the invention in its broader aspects.

We claim:

1. An automatic pilot system for aircraft in which maneuver commands are produced by operation of the pilot's control wheel, said system including servomotor means for controlling a control surface, attitude reference means for supplying a signal in accordance with departure of said craft from a predetermined attitude, and means responsive to said reference signal for controlling said servomotor means, wherein the improvement comprises:
   (a) an instrument servo loop having an input and having its output connected with said attitude reference means for modifying said attitude signal whereby to change the attitude of said craft,
   (b) means coupled with said control wheel for producing a signal proportional to the force exerted thereon and for supplying said signal as an input command to said instrument servo loop input whereby to command a change of attitude of said craft,
   (c) means for detecting attitude commands of a predetermined value, and
   (d) interlock switching means controlled by said detecting means for establishing a position feedback signal from said servo loop output back to its input for attitude commands less than said predetermined value and for removing said feedback signal for commands greater than said predetermined value whereby commanded aircraft attitude is proportional to said control wheel force signal magnitude for commanded attitudes less than said predetermined value and proportional to the integral of said control wheel force signal magnitude for commanded attitudes greater than said predetermined value.

2. The automatic pilot system as set forth in claim 1 wherein said means for producing said control wheel force signal comprises a force sensor means responsive to control wheel force for producing a signal in accordance therewith, means responsive to said force signal for detecting a predetermined threshold value thereof, means for suppressing said signal for values thereof below said predetermined value and for supplying a control signal proportional to control wheel forces in excess of said predetermined value as said instrument servo input command signal whereby inadvertent movements of said control wheel by the pilot do not result in control commands.

3. The automatic pilot system as set forth in claim 2 wherein said interlock switching means is controlled in accordance with both said detected value of attitude command signal and said detected value of said force signal.

4. The apparatus as set forth in claim 3 further including means for clamping said instrument servo loop, and further interlock switching means controlled by said first mentioned interlock means for operating said clamping means when said force signal decreases to a value below said predetermined threshold value whereby the attitude established by said control wheel signal is maintained.

5. In a control wheel steering system for an automatic pilot for aircraft selectively operable in a plurality of modes of operation, including servomotor means for controlling a control surface of said aircraft, attitude reference means for supplying a signal in accordance with departures of said aircraft from a predetermined attitude, and means responsive to said reference signal for controlling said servomotor means, wherein the improvement comprises:
   (a) force sensor means coupled with said control wheel for producing a signal proportional to the force exerted thereon by the human pilot,
   (b) means responsive to said force signal for detecting a first predetermined value thereof for suppressing said signal for values thereof below said first predetermined value and for supplying a command signal proportional to control wheel forces in excess of first predetermined value,
   (c) interlock switching means responsive to said detecting means in one of said operating modes for supplying said command signal to said attitude reference means whereby to vary the reference attitude of said craft in accordance therewith,
   (d) means operable in another of said operating modes for increasing said first predetermined value of said force signal to a second predetermined value thereof whereby to suppress said force signal for values thereof below said second predetermined value and for supplying a control signal proportional to said control wheel force signal in excess of said second predetermined value, and
   (e) further interlock switching means responsive to said second value of force signal for disengaging said other operating mode and for re-establishing said one operating mode.

6. The automatic pilot apparatus as set forth in claim 5 wherein said one operating mode is a manual maneuvering mode and wherein said other mode is an automatic path guidance mode.

7. An automatic pilot system for aircraft in which maneuver commands are produced by operation of the human pilot's control wheel, said system including servomotor means for controlling a control surface of said craft, attitude reference means for supplying a signal in accordance with departure of said craft from a reference attitude, and means responsive to said reference signal for controlling said servomotor means, said system further including radio guidance means for supplying guidance signals in accordance with the displacement and rate of approach of said craft relative to a radio defined course, wherein the improvement comprises:
   (a) attitude command means responsive to said radio guidance signals for modifying said attitude signal in a sense to cause said craft automatically to approach and maintain said radio course,
   (b) beam sensor means responsive to said radio guidance signals providing an output when said signals decrease to a predetermined low value whereby to indicate that said craft is substantially on said radio course, (c) means coupled with said control wheel for producing a signal proportional to the force exerted thereon by the pilot, and
(d) interlock switching means responsive to said force signal and said beam sensor means for supplying said force signal to said attitude command means in the absence of said beam sensor output for overriding said radio guidance signals whereby the craft approach to said beam may be altered by the human pilot prior to operation of the beam sensor means.

8. The automatic pilot as set forth in claim 7 further including means responsive to said control wheel force signal for detecting a first predetermined value thereof and wherein said interlock switching means is responsive to said first detected value of said force signal, and second interlock switching means responsive to said beam sensor output for establishing a second and greater predetermined value of said force signal detected by said detecting means, and third switching means responsive to said second value of said force signal for severing control of said attitude command means by said radio guidance signals.

References Cited

UNITED STATES PATENTS 3,021,097   2/1962   Hecht _____ 244—77
3,033,496   5/1962   Brands _____ 244—77

FERGUS S. MIDDLETON, Primary Examiner.